(12) United States Patent
Jung

(10) Patent No.: US 8,463,338 B2
(45) Date of Patent: Jun. 11, 2013

(54) SLIDE MODULE AND MOBILE TERMINAL HAVING THE SAME

(75) Inventor: Jaejun Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 49 days.

(21) Appl. No.: 13/240,121

(22) Filed: Sep. 22, 2011

(65) Prior Publication Data

US 2012/0100893 A1 Apr. 26, 2012

(30) Foreign Application Priority Data

Oct. 20, 2010 (KR) .......................... 10-2010-0102283

(51) Int. Cl.
*H04M 1/00* (2006.01)

(52) U.S. Cl.
USPC ....................................... 455/575.4; 455/566

(58) Field of Classification Search
USPC ............................................ 455/557.4, 566
See application file for complete search history.

(56) References Cited

U.S. PATENT DOCUMENTS

| 8,112,844 | B2 * | 2/2012 | Yong et al. ....................... 16/357 |
| 2008/0119250 | A1 * | 5/2008 | Cho et al. ..................... 455/575.4 |
| 2008/0176607 | A1 * | 7/2008 | Jin et al. ......................... 455/566 |
| 2009/0131127 | A1 * | 5/2009 | Hung .......................... 455/575.4 |
| 2009/0247248 | A1 * | 10/2009 | Ito ............................... 455/575.4 |
| 2010/0035668 | A1 * | 2/2010 | Lee ............................ 455/575.4 |
| 2010/0248798 | A1 * | 9/2010 | Ishikawa et al. ........... 455/575.4 |

\* cited by examiner

*Primary Examiner* — Barry Taylor
(74) *Attorney, Agent, or Firm* — KED & Associates LLP

(57) ABSTRACT

A slide module and mobile terminal including the same are disclosed. The slide module may include a first plate, a plurality of sliders mounted on the first plate and spaced apart from each other with a predetermined spacing therebetween, a guide plate configured to guide slidable movement of each of the plurality of sliders, and a second plate having the guide plate fixed thereto. With this structure, fluctuation and looseness may be prevented from being generated between two bodies in the course of switching between open or closed configurations by a slide mechanism. Further, a luxurious exterior may be provided by loading the slide module within each body so as not to be externally exposed in an open configuration.

19 Claims, 10 Drawing Sheets

SLIDE MODULE AND MOBILE TERMINAL HAVING THE SAME

CROSS-REFERENCE TO RELATED APPLICATION(S)

This application claims priority to Korean Patent Application No. 10-2010-0102283, filed on Oct. 20, 2010, which is hereby incorporated by reference in its entirety.

BACKGROUND

Field

A slide module and mobile terminal having the same are disclosed herein.

BRIEF DESCRIPTION OF THE DRAWINGS

Embodiments will be described in detail with reference to the following drawings in which like reference numerals refer to like elements, and wherein.

DETAILED DESCRIPTION

In the following detailed description, reference is made to the accompanying drawing figures which form a part hereof, and which show by way of illustration specific embodiments. It is to be understood by those of ordinary skill in this technological field that other embodiments may be utilized, and structural, electrical, as well as procedural changes may be made without departing from the scope. Where possible, like reference numbers have been used throughout the drawings to refer to the same or similar parts.

A mobile terminal is a device which may be configured to perform various functions. Examples of such functions may include, for example, data and voice communications, capturing images and video via a camera, recording audio, playing music files and outputting music via a speaker system, and displaying images and video on a display. Some terminals may include, for example, additional functionality that supports game playing, while other terminals may be also configured as multimedia players. More recently, mobile terminals have been configured to receive broadcast and multicast signals, which permit viewing of contents, such as videos and television programs.

Generally, terminals may be classified into mobile terminals and stationary terminals according to a presence or non-presence of mobility. The mobile terminals may be further classified into handheld terminals and vehicle mounted terminals according to availability for hand-carry.

There are ongoing efforts to support and increase the functionality of mobile terminals. Such efforts include, for example, software and hardware improvements, as well as changes and improvements in structural components which form the mobile terminal.

As used herein, the suffixes 'module', 'unit', and 'part' are used for elements in order to facilitate the disclosure only. Therefore, significant meanings or roles are not given to the suffixes themselves and it is understood that the 'module', 'unit', and 'part' may be used together or interchangeably.

Embodiments may be applicable to a various types of terminals. Examples of such terminals include, but are not limited to, mobile as well as stationary terminals, such as mobile phones, user equipment, smart phones, DTV, computers, digital broadcast terminals, personal digital assistants, portable multimedia players (PMP) and navigators. However, by way of a non-limiting example only, further description will be with regard to a mobile terminal, and it should be noted that such teachings may apply equally to other types of terminals.

Figure 1:
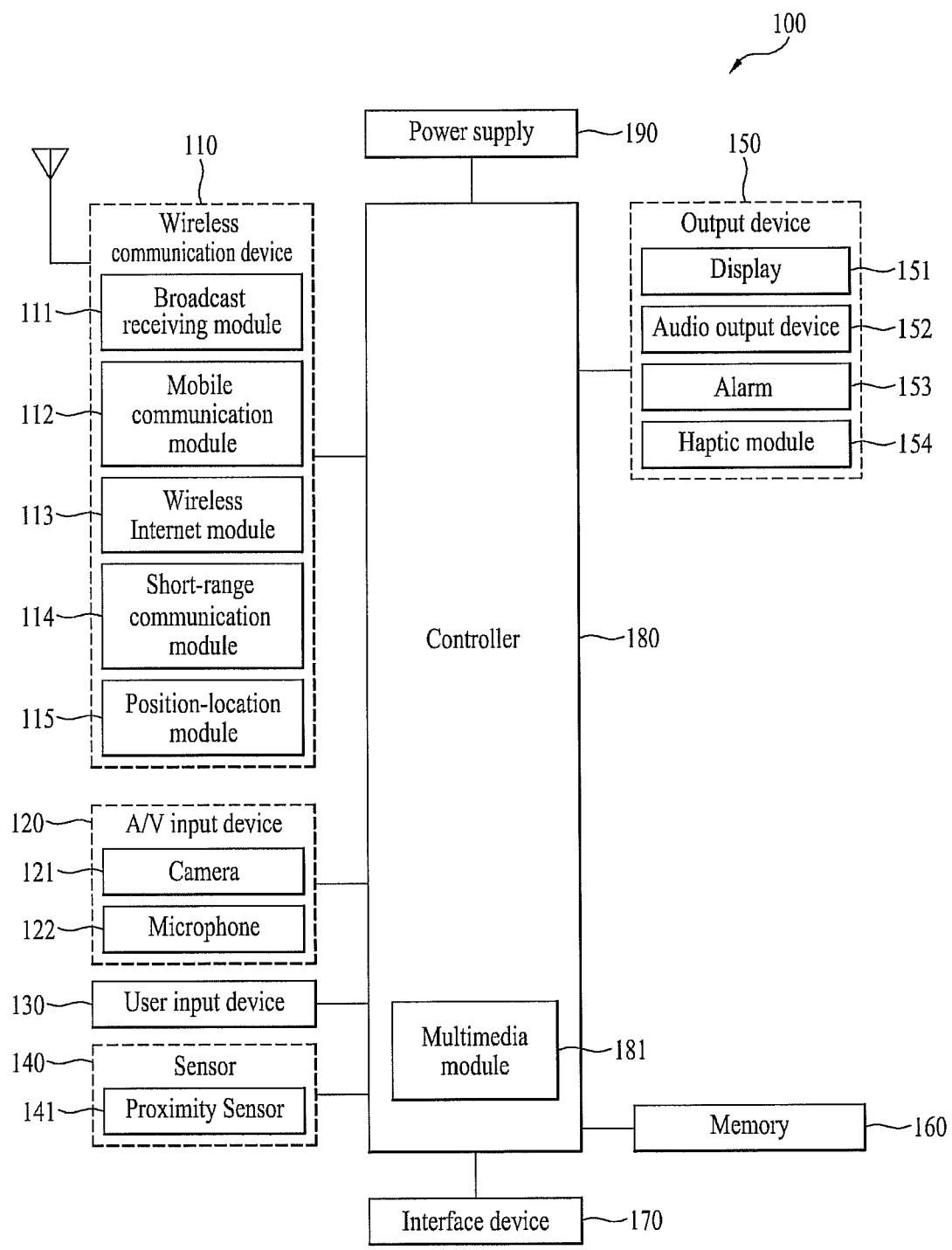
FIG. 1 is a block diagram of a mobile terminal in accordance with an embodiment.

FIG. 1 is a block diagram of a mobile terminal in accordance with an embodiment. FIG. 1 shows the mobile terminal having various components, but it is understood that implementing all of the illustrated components is not a requirement. Greater or fewer components may alternatively be implemented.

The mobile terminal of FIG. 1 may include a wireless communication unit or device 110, an audio/video (A/V) input unit or device 120, a user input unit or device 130, a sensor unit or sensor 140, an output unit or device 150, a memory 160, an interface unit or device 170, a controller 180, and a power supply 190. FIG. 1 shows the wireless communication device 110 configured with several commonly implemented components. For example, the wireless communication device 110 may include one or more components that permit wireless communication between the mobile terminal 100 and a wireless communication system or network within which the mobile terminal is located. In the case of non-mobile terminals, the wireless communication device 110 may be replaced with a wire communication device. The wireless communication device 110 and the wire communication device may be commonly referred to as a communication device.

The wireless communication device 110 may include a broadcast receiving module 111, a mobile communication module 112, a wireless Internet module 113, a short-range communication module 114, and a position-location module 115. The broadcast receiving module 111 may receive a broadcast signal and/or broadcast associated information from an external broadcast managing entity via a broadcast channel. The broadcast channel may include a satellite channel and a terrestrial channel. The term "broadcast managing entity" generally refers to a system that transmits a broadcast signal and/or broadcast associated information. The mobile terminal 100 may include at least two broadcast receiving modules 111 for simultaneous receptions of at least two broadcast channels or broadcast channel switching facilitation.

Examples of broadcast associated information may include, for example, information associated with a broadcast channel, and a broadcast program, a broadcast service provider. For example, the broadcast associated information may include an electronic program guide (EPG) of digital multimedia broadcasting (DMB) and an electronic service guide (ESG) of digital video broadcast-handheld (DVB-H).

The broadcast signal may be implemented, for example, as a TV broadcast signal, a radio broadcast signal, and/or a data broadcast signal. If desired, the broadcast signal may further include a broadcast signal combined with a TV or radio broadcast signal.

The broadcast receiving module 111 may be configured to receive broadcast signals transmitted from various types of broadcast systems. By nonlimiting example, such broadcasting systems may include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Receiving multicast signals may also be possible. If desired, data received by the broadcast receiving module 111 may be stored in a suitable device, such as memory 160.

The mobile communication module 112 may communicate wireless signals with one or more network entities, such as a base station or Node-B. Such signals may represent, for example, audio, video, multimedia, control signaling, and data. The wireless Internet module 113 may support Internet access for the mobile terminal 100. This module may be internally or externally coupled to the mobile terminal 100. Suitable technologies for wireless Internet may include, but are not limited to, WLAN (Wireless LAN), Wi-Fi, Wibro (Wireless broadband), Wimax (World Interoperability for Microwave Access), and HSDPA (High Speed Downlink Packet Access). The wireless Internet module 113 may be replaced with a wire Internet module in non-mobile terminals. The wireless Internet module 113 and the wire Internet module may be commonly referred to as an Internet module.

The short-range communication module 114 may facilitate relatively short-range communications. Suitable technologies for short-range communication may include, but are not limited to, radio frequency identification (RFID), infrared data association (IrDA), ultra-wideband (UWB), as well as the networking technologies commonly referred to as Bluetooth and ZigBee.

The position-location module 115 may identify or otherwise obtain a location of the mobile terminal 100. This module may be implemented using, for example, global positioning system (GPS) components, which cooperate with associated satellites, network components, and combinations thereof.

According to current technology, the position-location module 115, which may be in the form of a GPS module, may be able to precisely calculate current 3-dimensional position information based on longitude, latitude, and altitude by calculating distance information and precise time information from at least three satellites and then applying triangulation to the calculated information. Currently, location and time information may be calculated using three satellites, and errors in the calculated location position and time information may then be amended or corrected using another satellite. The position-location module 115 may be able to calculate speed information by, for example, continuously calculating a real-time current location.

The mobile terminal 100 may further include the A/V input device 120. The A/V input device 120 may be configured to provide audio or video signal input to the mobile terminal 100. As shown, the A/V device 120 may include a camera 121 and a microphone 122. The camera 121 may receive and process image frames of still pictures or video. The microphone 122 may receive an external audio signal while the portable device is in a particular mode, such as a phone call mode, a recording mode, or a voice recognition mode. This audio signal may be processed and converted into digital data.

The portable device, and more specifically the A/V input device 120, may include assorted noise removing algorithms that remove noise generated in the course of receiving the external audio signal. Data generated by the A/V input device 120 may be stored in the memory 160, utilized by the output device 150, or transmitted via one or more modules of communication device 110. If desired, two or more microphones and/or cameras may be used.

The user input device 130 may generate input data responsive to user manipulation of an associated input mechanism or mechanisms. Examples of such mechanisms may include, for example, a keypad, a dome switch, a touchpad, such as a static pressure/capacitance touchpad, a jog wheel, and a jog switch. According to one embodiment, the user input device 130 may be configured as a touchpad in cooperation with a display, which will be described in more detail below.

The sensor 140 may provide status measurements of various aspects of the mobile terminal 100. For example, the sensor 140 may detect an open/close status of the mobile terminal 100, relative positioning of components, such as a display and keypad of the mobile terminal, a change in position of the mobile terminal or a component of the mobile terminal, a presence or absence of user contact with the mobile terminal, and orientation or acceleration/deceleration of the mobile terminal. If the mobile terminal 100 is configured as a slide-type mobile terminal, the sensor 140 may sense whether a sliding portion of the mobile terminal is open or closed. Other examples include the sensor 140 sensing the presence or absence of power provided by the power supply 190, and the presence or absence of a coupling or other connection between the interface device 170 and an external device.

An interface device 170 may couple the mobile terminal with external devices. The external devices may include, for example, wired/wireless headphones, external chargers, power supplies, storage devices configured to store data, such as audio, video, and images or pictures, as well as earphones and microphones. The interface device 170 may be configured using a wired/wireless data port, audio input/output ports, video input/output port, or a card socket configured to receive to a memory card, a subscriber identity module (SIM) card, a user identity module (UIM) card, or removable user identity module (RUIM) card).

When the mobile terminal 110 is connected to an external cradle, the interface device 170 may become a passage that supplies the mobile terminal 100 with power from the cradle or a passage that delivers various command signals input from the cradle by a user to the mobile terminal 100. Each of the various command signals input from the cradle, or the power may operate as a signal enabling the mobile terminal 100 to recognize that it is correctly loaded in the cradle.

The output device 150 may include various components that support output requirements of the mobile terminal 100. For example, the output device 150 may include a display 151, an audio output device 152, an alarm 153, and a haptic module 154. The display 151 may visually display information associated with the mobile terminal 100. For example, if the mobile terminal 100 is operating in a phone call mode, the display may provide a user interface or graphical user interface that includes information associated with placing, conducting, and terminating a phone call. As another example, if the mobile terminal 100 is in a video call mode or a photographing mode, the display 151 may additionally or alternatively display images associated with these modes.

According to one embodiment, the display 151 may be configured as a touch screen working in cooperation with an input device, such as a touchpad. This configuration permits the display 151 to function both as an output device and an input device.

The display 151 may be implemented using known display technologies including, for example, a liquid crystal display (LCD), a thin film transistor-liquid crystal display (TFT-LCD), an organic light-emitting diode display (OLED), a flexible display, and a three-dimensional display. The display may be transparent so that an external environment may be seen through the corresponding display. Such a display may be called a transparent display. An example of such a transparent display is a transparent LCD display.

The mobile terminal 100 may include one or more displays 151. An example of a two-display embodiment is one in which one display 151 is configured as an internal display viewable when the terminal is in an open position and a second display 151 configured as an external display viewable in both the open and closed positions.

The touchscreen may be configured to detect a touch input pressure, as well as a touch input position and size.

The sensor 140 may include a proximity sensor 141. The proximity sensor 141 may be provided within or around or adjacent the touchscreen. The proximity sensor 141 may detect that an object approaches a predetermined detecting surface, or a presence or non-presence of an object disposed adjacent the sensor, using, for example, electromagnetic power or infrared rays, without mechanical contact. Hence, the proximity sensor may be superior to a contact sensor in lifespan and utilization.

The proximity sensor may operate as follows. First, if an object approaches a sensor detecting surface while an oscillation circuit oscillates a sine radio frequency, an oscillation amplitude of the oscillation circuit may attenuate or stop. This change may be converted into an electric signal to detect a presence or non-presence of the object. Thus, if any material except a metallic material comes between the RF oscillation proximity sensor and the object, a proximity switch is able to detect the object without interference with the material.

Even if the proximity sensor is not included, if the touchscreen is electrostatic, it may be configured to detect the proximity of a pointer through an electric field change attributed to the proximity of the pointer. In such a case that the pointer is placed in the vicinity of the touchscreen without actually contacting the touchscreen, the touchscreen is able to detect a position of the pointer and a distance between the pointer and the touchscreen. For clarity and convenience of explanation, an action for enabling the pointer approaching the touchscreen to be recognized as placed on the touchscreen may be referred to as a 'proximity touch' and an action of enabling the pointer to actually come into contact with the touchscreen may be referred to as a 'contact touch'. A position, at which the proximity touch is made to the touchscreen using the pointer, may mean a position of the pointer vertically corresponding to the touchscreen when the pointer makes the proximity touch.

If a proximity sensor is used, it may sense a proximity touch and its pattern (for example, a proximity touch distance, a proximity touch direction, a proximity touch speed, a proximity touch position, and a proximity touch moving state). It may also output information corresponding to the sensed proximity touch action and the proximity touch pattern to the touchscreen.

The output device 150 of FIG. 1 may include an audio output module 152 that supports the audio output requirements of the mobile terminal 100. The audio output module 152 may be implemented using, for example, one or more speakers, buzzers, other audio producing devices, and/or combinations thereof. The audio output module 152 may function in various modes, such as a call-receiving mode, a call-placing mode, a recording mode, a voice recognition mode, and a broadcast reception mode. During operation, the audio output module 152 may output audio relating to a particular function or status, such as, for example, call received, message received, or errors.

The output device 150 may further include an alarm 153, which may be used to signal or otherwise identify the occurrence of a particular event associated with the mobile terminal 100. Typical events may include, for example, call received, message received, and user input received.

An example of a signal provided by the output device 150 is a tactile sensations signal. For example, the alarm 153 may be configured to vibrate responsive to the mobile terminal 100 receiving a call or message. As another example, vibration may be provided by the alarm 153 responsive to receiving user input at the mobile terminal 100, thereby providing a tactile feedback mechanism. The various signals provided by the components of the output device 150 may be separately performed, or may be performed using any combination of components.

The memory 160 may be used to store various types of data to support, for example, processing, control, and storage requirements of the mobile terminal 100. Examples of such data include, but are not limited to, program instructions for applications operating on the mobile terminal 100, contact data, phonebook data, messages, pictures, and video. Moreover, data for various patterns of vibration and/or sound output in a case of a touch input to the touchscreen may be stored in the memory 160.

As map information may be stored in the memory 160, user convenience may be further enhanced by providing the map information to the user, if necessary or desired. Moreover, a recent use history or a cumulative use frequency of each menu in the mobile terminal may be stored in the memory 160.

The memory 160 shown in FIG. 1 may be implemented using, for example, any type or combination of suitable volatile and non-volatile memory or storage devices including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device.

The controller 180 may control the overall operations of the mobile terminal 100. For example, the controller 180 may perform the control and processing associated with, for example, voice calls, data communications, instant message communications, video calls, camera operations, and recording operations.

The controller 180 may include a multimedia module 181 that provides multimedia playback. The multimedia module 181 may be configured or provided as part of the controller 180, or implemented as a separate component. Moreover, the controller 180 may perform a pattern recognizing process for recognizing a writing input and a picture drawing input carried out on the touchscreen as characters or images, respectively.

The power supply 190 may provide power required by the various components for the mobile terminal 100. The power may be, for example, internal power, external power, or combinations thereof.

Various embodiments described herein may be implemented in a computer-readable medium using, for example, computer software, hardware, or some combination thereof. For a hardware implementation, the embodiments described herein may be implemented, for example, within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units or devices designed to perform the functions described herein, or a selective combination thereof. In some cases, such embodiments may also be implemented by the controller 180.

For a software implementation, the embodiments described herein may be implemented, for example, using separate software modules, such as procedures and functions, each of which perform one or more of the functions and operations described herein. The software codes may be implemented with a software application written in any suitable programming language and may be stored in a memory, such as the memory 160, and executed by a controller or processor, such as the controller 180.

The mobile terminal 100 may be implemented in a variety of different configurations. Examples of such configurations may include folder-type, slide-type, bar-type, rotational-type, swing-type, and combinations thereof. For clarity, further disclosure will primarily relate to a slide-type mobile terminal 100. However, such teachings apply equally to other types of mobile terminals.

Figure 2:
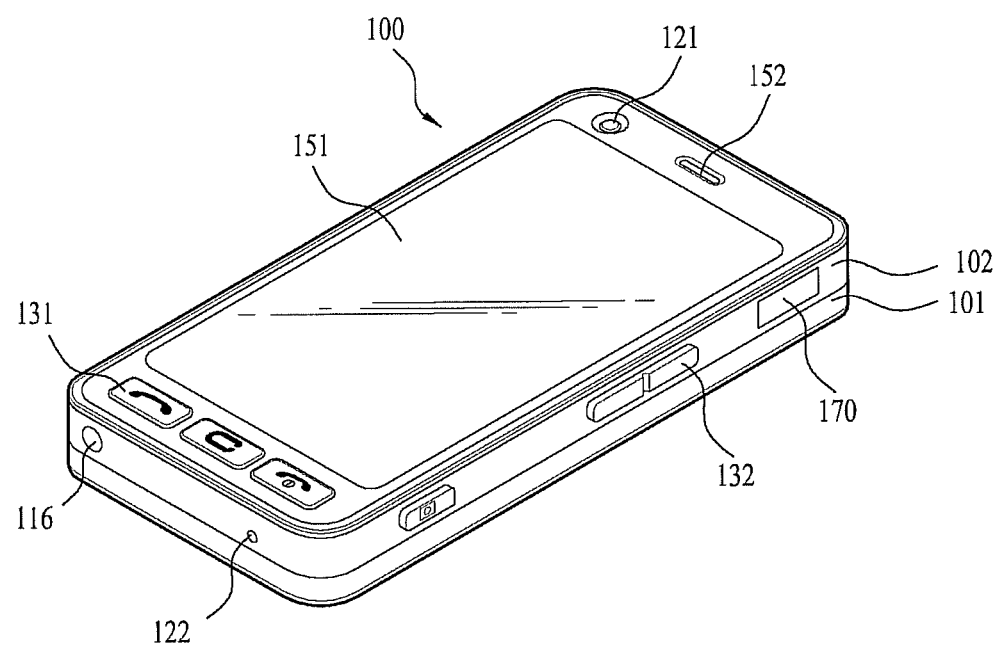
FIG. 2 is a front perspective view of a mobile terminal according to an embodiment.

FIG. 2 is a front perspective view of a mobile terminal according to an embodiment. Referring to FIG. 2, the mobile terminal 100 may include a terminal body, which may be of a slide type, in which a pair of bodies are assembled together in a manner that they can move relatively to one another. The terminal body may include a first body 101 and a second body 102 configured to be slidable on the first body 101.

With respect to FIG. 2, a closed configuration may be a state in which the first body 101 is superposed onto the second body 102. An open configuration may by a state in which the first body 101 slidably moves with respect to the second body 102 to expose at least a portion of the second body 102.

Further, the first and second bodies 101 and 102 may include a case (for example, a casing, a housing, or a cover) that forms an exterior thereof. The case may be formed, for example, by injection molding using, for example, synthetic resin or may be formed using a metal substance, such as stainless steel (STS), or titanium (Ti).

The second body 102 may include a second display 151, an (first) audio output module 152, a (first) camera 121, a user input unit or device 130 including user manipulating devices 131/132, a jack 116, a microphone 122, and an interface 170. The second display 151 may occupy most of one surface of the second body 101. The audio output module 152 and the camera 121 may be provided in a region adjacent to one end portion of both end portions of the second display 151, while the user input manipulating device 131, the jack 116, and the microphone 122 may be provided in another region adjacent to the other end portion. The user manipulating device 132 and the interface 170 may be provided at lateral sides of the first and second cases 101 and 102.

The user input device 130 may be manipulated to receive input of a command for controlling an operation of the mobile terminal 100 and may include a plurality of user manipulating devices 131 and 132. The user manipulating devices 131 and 132 may have a common name, for example, a manipulating portion, and may adopt any system in a tactile manner enabling a user to perform manipulation with a tactile feel.

Contents input via the first manipulating device 131 or the second manipulating device 132 may be configured to function in various ways. In particular, the first manipulating device 131 may be configured to input a command, such as, for example, a start command, an end command, or a scroll command. The second manipulating device 132 may be configured to receive an input command, such as a level adjustment command for output of sound from the audio output device 152, or a switching command to a touch recognizing mode of the second display 151.

Figure 3:
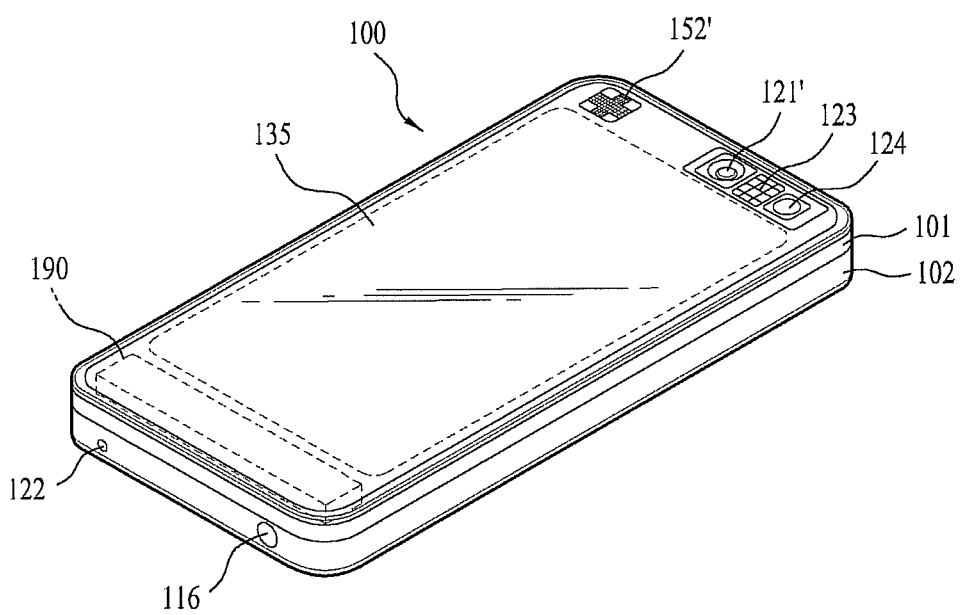
FIG. 3 is a rear perspective view of the mobile terminal of FIG. 2.

FIG. 3 is a rear perspective diagram of the mobile terminal 100 of FIG. 2. Referring to FIG. 3, a (second) camera 121' may also be provided on the first body 101. The camera 121' may have a photographing direction substantially opposite to that of the camera 121 of FIG. 2 and may have a number of pixels or a resolution different from that of the camera 121.

For instance, the camera 121 provided on the second body 102 may have a low number of pixels or a low resolution to allow a user's face to be easily photographed and sent in the case of, for example, a video call. The camera 121' provided on the first body 101 may be configured to take a picture of a general subject for a case in which the user does not intend to directly send the taken picture. Hence, the camera 121' may have a high number of pixels or a higher resolution. The cameras 121 and 121' may be provided in the second and first bodies in a manner of being rotatable or popped up, respectively.

A flash 123 and a mirror 124 may be provided adjacent to the camera 121'. When a picture of a subject is taken using the camera 121', the flash 123 may project light toward the subject. In a case in which a user attempts to take a picture of himself/herself using the camera 121' [self-photographing], the mirror 124 may enable the user to see his/her face reflected on or in the mirror.

An (second) audio output module 152' may be provided on a backside of the first body 101. The audio output module 152' may be configured to implement a stereo function together with the audio output module 152 of FIG. 2. The audio output module 152' may be configured to implement a speakerphone mode for making a phone call.

A broadcast signal receiving antenna (not shown) for a call may be provided at one side of each of the first and second bodies 101 and 102. This antenna may be retractable from/into the terminal body and may be part of the broadcast receiving module 111 of FIG. 1.

A power supply 190 may be provided on or in the first body 101 to supply power to the mobile terminal 100. The power supply 190 may be built in the terminal body or may be externally provided attachable to/detachable from the terminal body.

A first display 135 may be provided on the first body 101. The first display 135 may include a touchpad or a touchscreen to detect a touch.

The first display 135 may be operated by being linked to the second display 151. The first display 135 may be provided in parallel with the second display 151 at a rear or in a front of the second display 151. The first display 135 may have a size equal to or smaller that the second display 151. Moreover, each of the first and second displays 135 and 151 may include a touchscreen to which a touch input may be applied.

Figure 4:
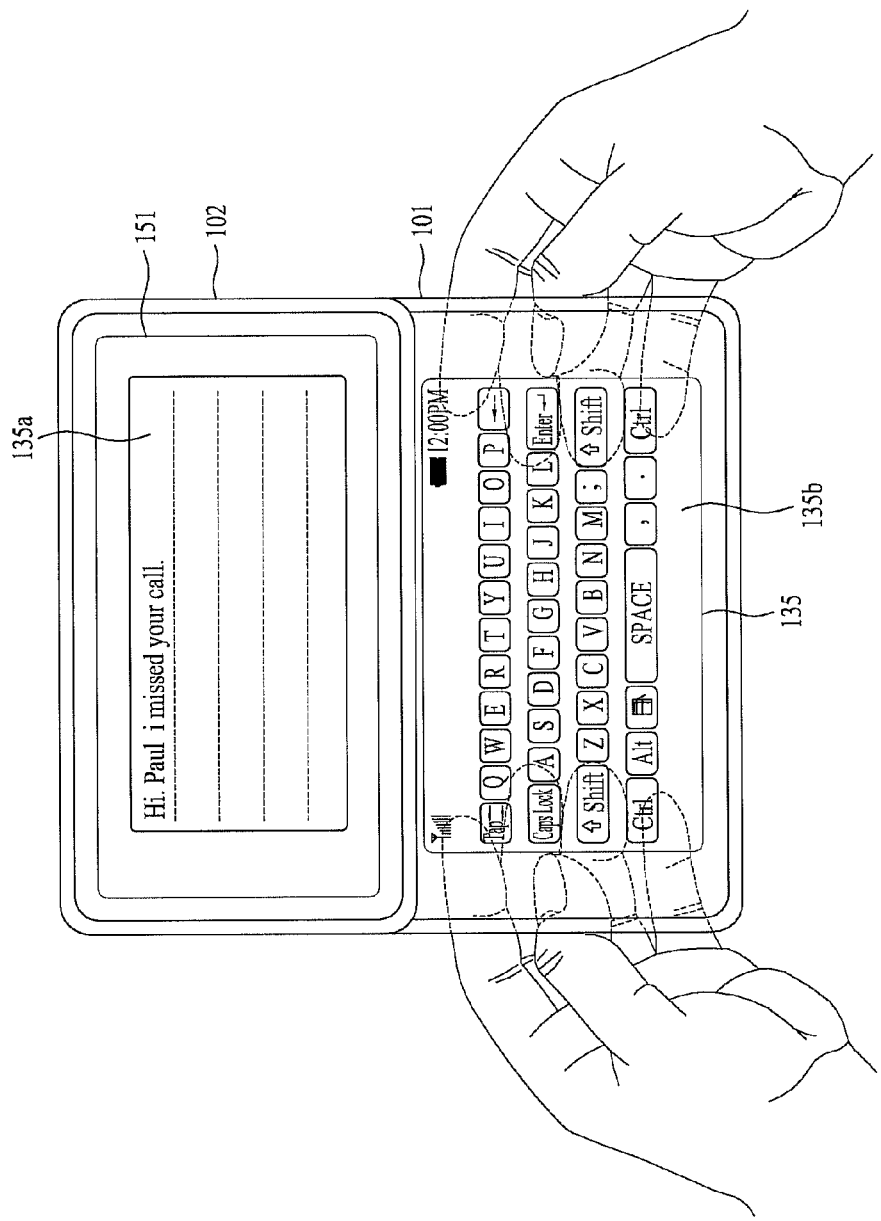
FIG. 4 is a view of a mobile terminal for explaining an exemplary operational status of a mobile terminal according to an embodiment.

FIG. 4 is a view of a mobile terminal for explaining an exemplary operational status of a mobile terminal according to an embodiment.

First, if the first body 101 is arranged in a manner of being superposed on the second body 102, as shown in FIGS. 2 and 3, it may be referred to as in a closed configuration. If the second body 102 slidably moves with respect to the first body 101 so as to expose at least a portion of the first body 101, as shown in FIG. 4, it may be referred to as in an open configuration.

Referring to FIG. 4, various types of visual informations may be displayed on the second display 151 which is externally exposed in the closed configuration. Further, a variety of information may be displayed using, for example, characters, numerals, symbols, graphics, and/or icons.

In order to input such information, at least one of the characters, numerals, symbols, graphics, and/or icons may be represented as a single predetermined array to be implemented in a keypad formation. This keypad formation may be so-called 'soft keys'.

More particularly, FIG. 4 shows a text input mode activated in the mobile terminal. According to one embodiment, an output window 135a and an input window 135b may be displayed on the second display 151 and the first display 135, respectively. As mentioned in the foregoing description, a plurality of soft keys representing at least one of characters, symbols, or digits may be arranged in the input window 135b. In this case, the soft keys may be arranged in the QWERTY key formation. Moreover, as mentioned in the foregoing description, a keypad may be provided on the first body instead of the first display 135.

If the soft keys are touched through a touch input to the first display 135, characters, symbols, and digits corresponding to the touched soft keys may be output to the output window 135a of the second display 151. Thus, the input window 135b and the output window 135a may be output via the first display 135 and the second display 151, respectively, to increase sizes of the soft keys. Hence, the number of correct touch inputs may be increased or improved.

The second display 151 or the first display 135 may be configured to receive a touch input via a scroll. A user may scroll the second display 151 or the first display 135 to shift a cursor or pointer located or displayed on each of the displays 135 and 151.

Further, in a case in which a finger is shifted on the first display 151 or the second display 135, a path of the shifted finger may be visually displayed on the respective display. This may be useful in editing an image displayed on the displays 135 and 151.

In a case in which both the first and second displays 135 and 151 are touched together within a predetermined period of time, one function of the terminal may be executed. The above case of the simultaneous touching may correspond to a case in which the first and second bodies 101 and 102 are held by a user using both hands (for example, clamping).

Moreover, multitasking jobs may be smoothly performed via the first and second displays 135 and 151. When a game or multimedia application is driven, the first and second displays 135 and 151 may provide various user interface configurations.

Figure 5:
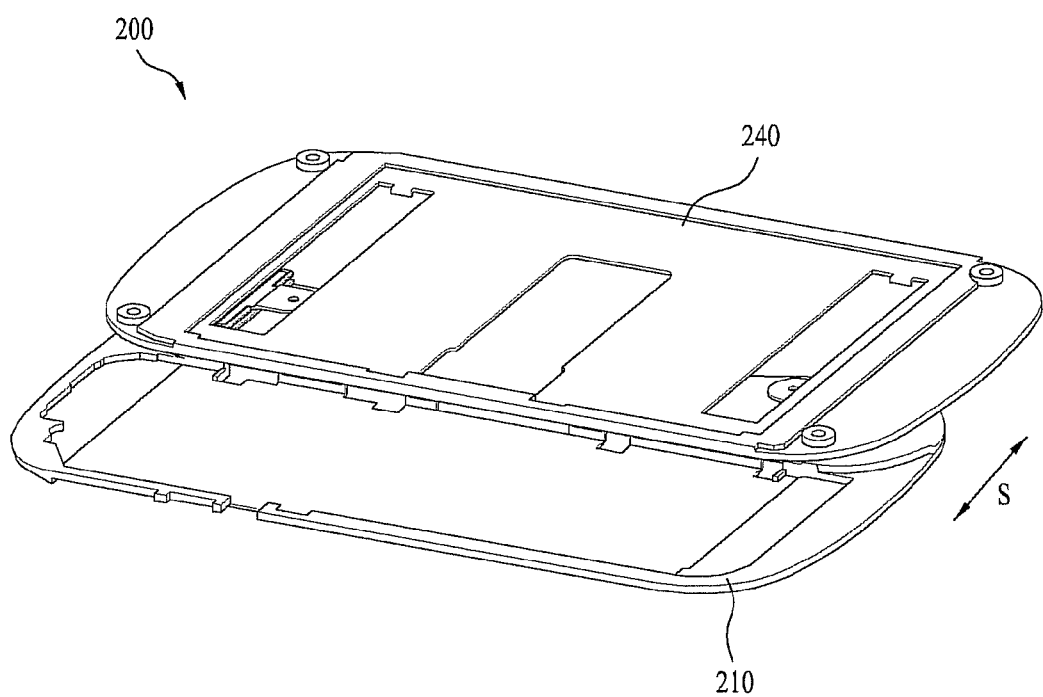
FIG. 5 is a perspective view of a slide module according to an embodiment.
Figure 6:
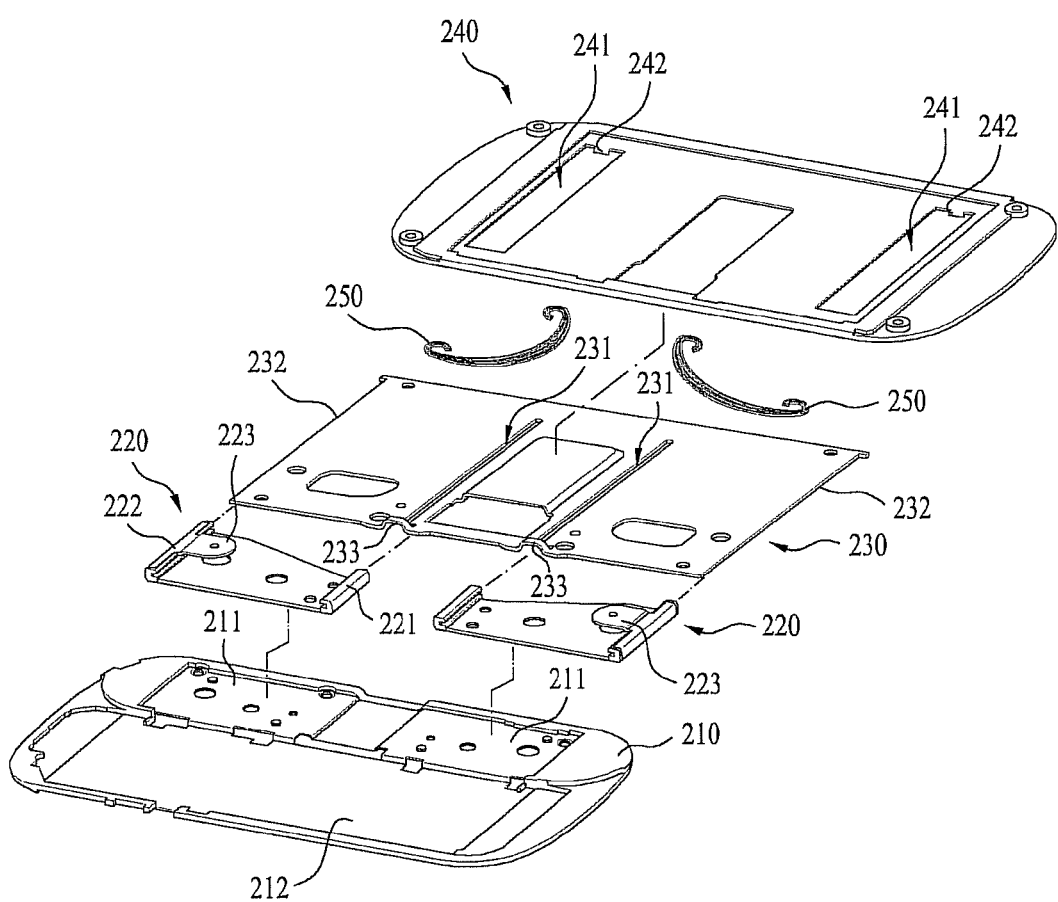
FIG. 6 is an exploded perspective view of the slide module of FIG. 5.
Figure 7:
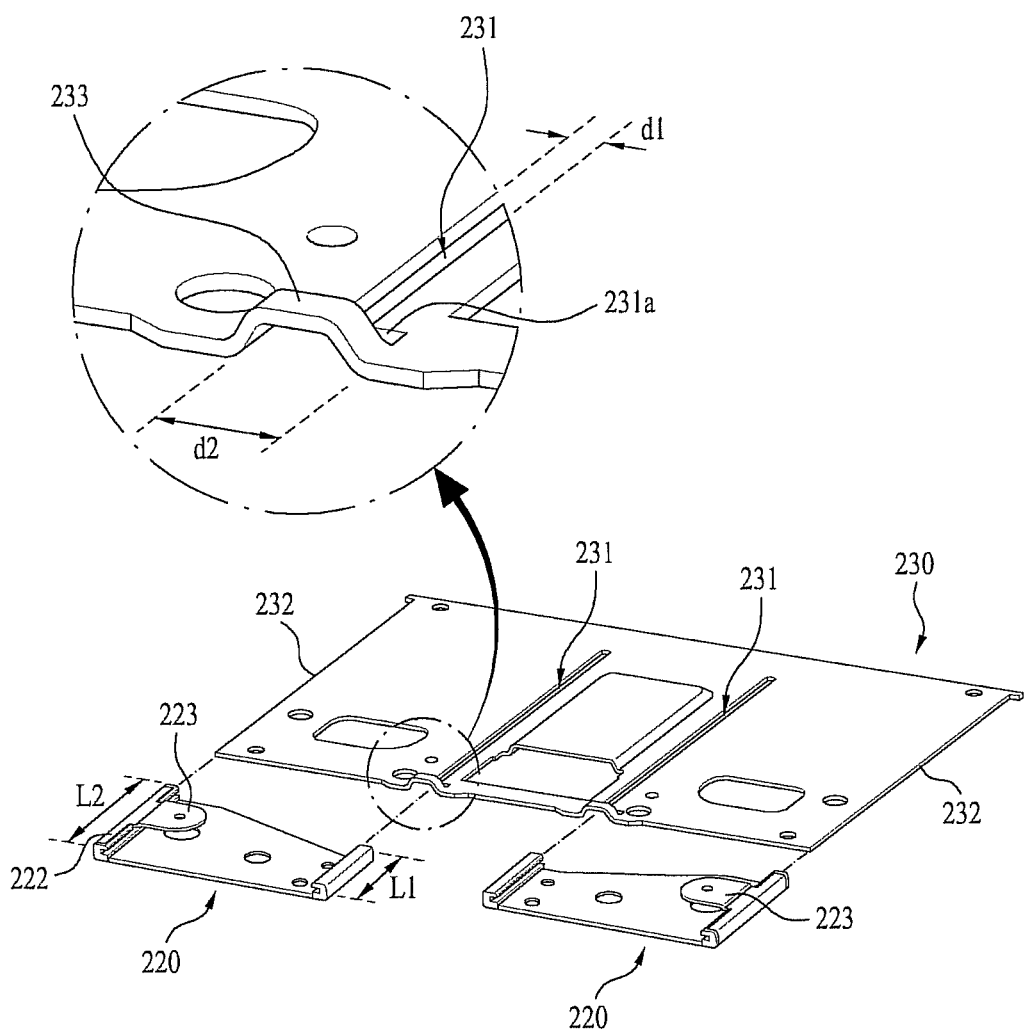
FIG. 7 is a detailed perspective diagram of a guide plate and sliders of the slide module of FIG. 5.
Figure 8:
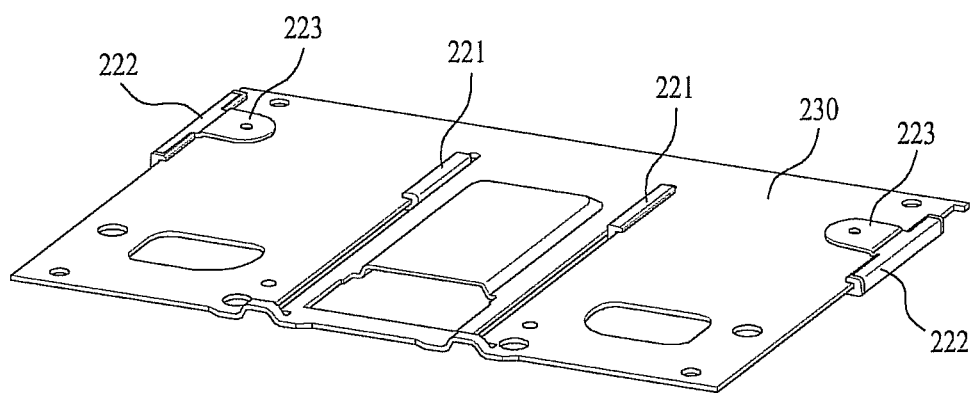
FIG. 8 is a perspective diagram of the assembled components of FIG. 7.

FIG. 5 is a perspective view of a slide module according to an embodiment. FIG. 6 is an exploded perspective view of the slide module of FIG. 5. FIG. 7 is a detailed perspective view of a guide plate and sliders of the slide module of FIG. 5. FIG. 8 is a perspective view of the assembled components of FIG. 7.

Figure 9:
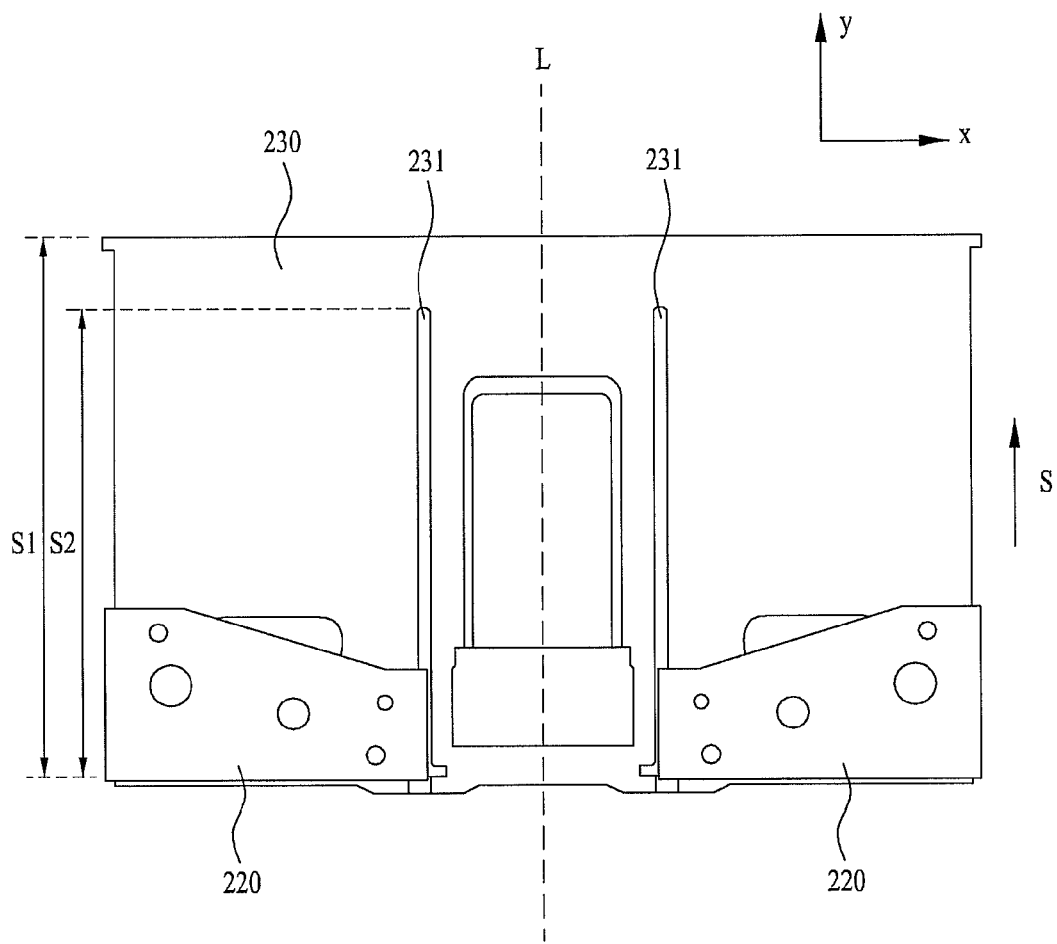
FIG. 9 and FIG. 10 are layouts of a slide module according to an embodiment for describing an exemplary operational status of the slide module.
Figure 10:
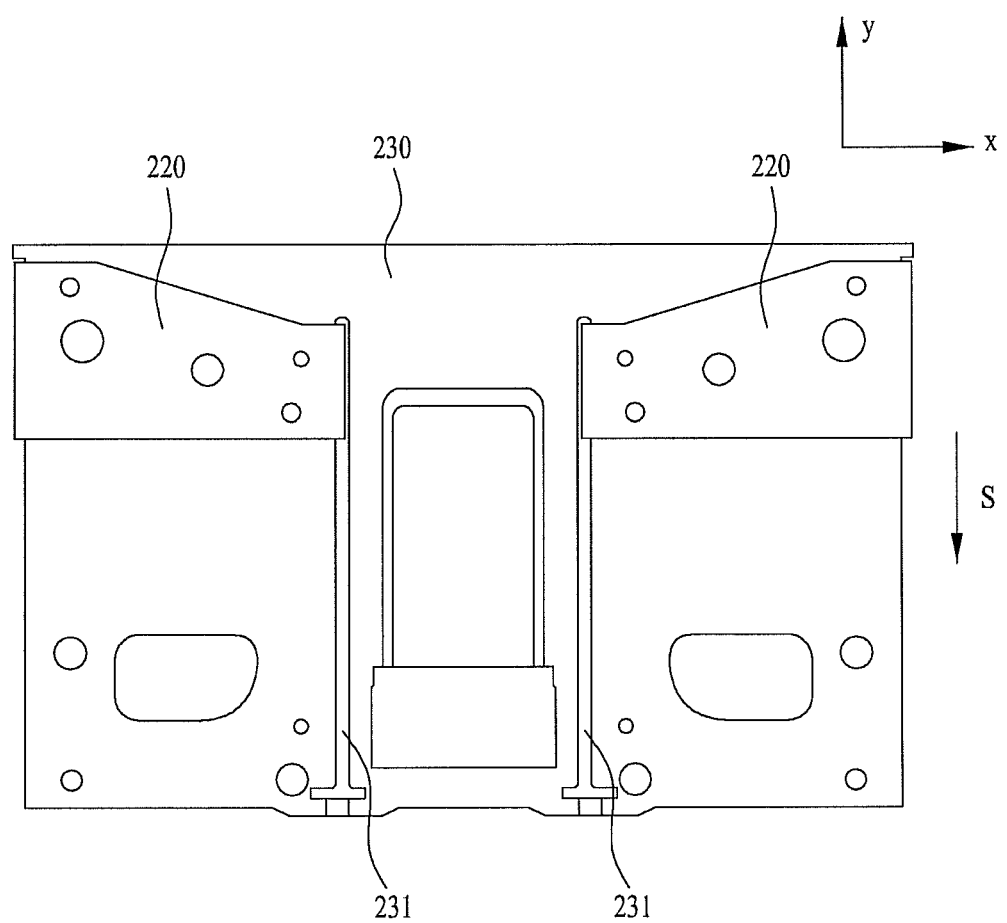

FIG. 9 and FIG. 10 are layouts of a slide module according to an embodiment for describing an exemplary operational status of the slide module. In particular, FIG. 9 is a layout of a slide module in an open configuration of a mobile terminal, while FIG. 10 is a layout of a slide module in a closed configuration of a mobile terminal.

The mobile terminal 100 according to an embodiment may include a first body 101, a second body 102 mounted on the first body 101 to slidably move with respect thereto, and a slide module 200. The slide module 200 may include a plurality of sliders 220, respectively, mounted on the first body 101 and a guide plate 230 mounted on the second body 102 to guide slidable movement of the plurality of the sliders 220.

The slide module 200 is described in detail with reference to the accompanying drawings as follows.

First, the slide module 200 according to an embodiment may include a first plate 210, the plurality of sliders 220 being mounted on the first plate 210 and spaced apart from each other with a predetermined space therebetween; a guide plate 230 configured to guide slidable movement of each of the plurality of sliders 220, and a second plate 240 having the guide plate 230 fixed thereto.

As mentioned in the foregoing description, a case, an exterior of which may be formed by the first and second bodies 101 and 102, may be divided into a front case and a rear case. Further, a middle case may additionally be provided between the front case and the rear case.

The front case of the first body 101 may refer to the case forming a region that is externally exposed in a case of slidable movement of the second body 102 (i.e., open configuration). The front case of the second body 102 may refer to the case forming a region that is externally exposed in a closed configuration of the mobile terminal 100. In this case, the first plate 210 may be the front or rear case forming the exterior of the first body 101 or the middle case provided between the front case and the rear case. Further, the second plate 240 may be the front or rear case forming the exterior of the second body 102 or the middle case provided between the front case and the rear case.

Referring, for example, to one embodiment, a first loading recess 211 may be provided on a face of the first plate 210 corresponding to the front case to receive each of a plurality of the sliders 220 thereon. A second loading recess 212 may be provided on the first plate 210 to receive a keypad or a first display therein.

The first plate 210 may be the middle case of the first body 101. The front case may be mounted on the front side of the first plate 210. The rear case may be mounted on a rear side of the first plate 210. A power supply (not shown in the drawings) may be provided between the first plate 210 and the rear case.

The second plate 240 may be the rear or middle case of the second body 102. For clarity of the following description of the slide module 200, the terms the first body 101 and the first plate 210 may be construed as being the same. Further, the terms the second body 102 and the second plate 240 may be construed as being the same. Referring to FIG. 5, reference numeral 'S' indicates a slidable movement direction of the second body 102 (or the second plate 240) against or with respect to the first body 101 (or the first plate 210).

Referring to FIG. 6 and FIG. 7, a plurality of guide slots 231 may be provided on or in the guide plate 230. A first end portion 221 of each slider 220 may be guided along a corresponding guide slot 231. A second end portion 222 of each slider 220 may be guided along an edge portion 232 of the guide plate 230.

Each of the end portions 221 and 222 of each slider 220 may be configured to enclose a partial region of the guide slot 231 and the edge portion 232 of the guide plate 230, respectively. For instance, each of the end portions 221 and 222 of each slider 220 may have a '⌒' cross-section.

Each of the plurality of guide slots 231 may be formed to extend along a slide direction S of the second plate 240. In the embodiment of FIG. 5, the number of the guide slots 231 is 2 and the number of sliders 220 is 2; however, embodiments are not limited to these numbers.

One end portion 231a of the guide slot 231 may be open to enable the first end portion 221 of the slider 220 to be inserted into or onto the guide plate 230. A reinforcement bridge 233 may be provided to or at the open end portion 231a of the guide slot 231.

The guide plate 230 may include a single plate. In a case in which a plurality of guide slots 231 are provided to guide a plurality of the sliders 220, respectively, the rigidity of the guide plate 230 may be decreased. In order to provide sufficient rigidity, the guide plate 230 may be manufactured, for example, by welding a plurality of plates together. However, this requires a plurality of molds for manufacturing the various parts of the guide plate. Therefore, the manufacturing costs increase due to the welding and required molds. Further, if the mobile terminal 100 is dropped, the welded parts may break.

Therefore, it is important to form the guide plate with sufficient rigidity in order to lower costs. For this, the reinforcement bridge 233 is provided at the open end portion 231a of the guide slot 231 of the guide plate 230.

Referring to FIG. 7, the reinforcement bridge 233 may be bent to have a prescribed or predetermined height difference from or with respect to the guide slot 231. A width d2 of the open end portion 231a of the guide slot 231 may be formed greater than a width d1 of a remaining portion of the guide slot 231.

Therefore, the first end portion 221 of the slider 220 may avoid interference with the reinforcement bridge 233 and may be inserted into the guide plate 230 via the open end portion 231a of the guide slot 231. Moreover, if the reinforcement bridge 233 is provided on the guide plate 230 by being bent therefrom, a single plate may be manufactured with sufficient rigidity.

A projection part 223 may be provided at the second end portion 222 of the slider 220 that projects toward an inside or a center of the guide plate 230. A guide hole 241 may be provided in the second body 102 (or the second plate 240) to guide movement of the projection part 223 in accordance with the slidable movement of the slider 220.

More particularly, in a case of slidable movement of the second body 102 (or the second plate 240) against or with respect to the first body 101 (or the first plate 210), the end portions 221 and 222 of the slider 220 may be guided by the guide slot 231 and the edge portion 232 of the guide plate 230. The projection part 223 of the slider 220 may be guided within the guide hole 241 of the second body 102 (or the second plate 240).

Moreover, a stopper 242 may be provided in the guide hole 241 to maintain a slidable displacement of the projection part 223 of the slider 220. Alternatively, the stopper may be provided on the guide plate 230.

The mobile terminal 100 according to an embodiment may further include an elastic actuator 250 having end portions fixed to the projection part 223 of the slider 220 and the second body 102 (or the second plate 240), respectively.

In a case in which the second plate 240 slides by a prescribed or predetermined distance on the first plate 210 to reach a fully open configuration, the elastic actuator 250 may force the second plate 240 in an open direction. In a case in which the second plate 240 slides on the first plate 210 by a displacement smaller than the prescribed or predetermined distance to reach a closed configuration, the elastic actuator 250 may function to force the second plate 240 in a closing direction.

The configuration of the slider 220 is explained in detail with reference to the accompanying drawings as follows.

Referring to FIGS. 7 to 9, each of the sliders 220 may be formed to have a length L1 of the first end portion 221 set smaller than a length L2 of the second end portion 222. Thus, the slider 220 may have an asymmetric structure.

Moreover, each of the sliders 220 may be arranged to form a symmetric structure in the slidable movement direction S of the second body [refer to dotted line L shown in FIG. 9]. Therefore, a length S2 of each guide slot 231 may be formed smaller than a length S1 of the guide plate 230 with respect to the slidable movement direction S of the second body 102 (or the second plate 240).

Thus, if the slider 220 has an asymmetric structure, the guide slot 231 may have a short length. Therefore, sufficient rigidity of the guide plate 230 may be provided.

Referring to FIG. 9 and FIG. 10, if slidable movement of the mobile terminal is guided by the plurality of the sliders 220, fluctuation and looseness in the X and Y directions may be prevented. In a case in which the slidable movement is guided using a single slider, as each of the bodies 101 and 102 increases in size, it is necessary to increase a width of the slider. If the width of the slider is increased, it eventually causes fluctuation and looseness in the X and Y directions.

In a case in which the slidable movement of the mobile terminal is guided by a plurality of sliders 220, a width of each of the plurality of sliders 220 may be relatively decreased. Therefore, even if an external force is applied thereto, only small deflection and deformation may be expected.

As mentioned in the foregoing description, a keypad may be provided on the first body 101. A display may be provided on the second body 102.

Herein, a slide module according to embodiments has been described with respect to a mobile terminal; however, the slide module according to embodiments is not limited thereto. For instance, the slide module according to embodiments may be applicable to various electronic products including at least two bodies that may be closed and opened in a manner of slidable movement.

A slide module 200 according to an embodiment may include a first plate 210, a plurality of sliders 220 mounted on the first plate 210 and spaced apart from each other with a predetermined space therebetween, a guide plate 230 configured to guide a slidable movement of each of the plurality of sliders, and a second plate 240 having the guide plate 230 fixed thereto.

As mentioned in the foregoing description, a plurality of guide slots 231 may be provided on the guide plate 230. A first end portion 221 of the slider 220 may be guided along the corresponding guide slot 231. A second end portion 222 of the slider 220 may be guided along an edge portion 232 of the guide plate 230.

Moreover, one end portion 231a of the guide slot 231 may be open to enable the first end portion 221 of the slider 220 to be inserted into the guide plate 230. A reinforcement bridge 233 may be provided at the open end portion 231a of the guide slot 231.

The open end portion 231a of the guide slot 231 may be formed wider than a width of the guide slot 231. For each of the sliders 220, the first end portion 221 may be formed to have a length smaller than that of the second end portion 222.

The sliders 220 may be fixed to the first plate 210 so as to be symmetric in a slidable movement direction of the second plate 240. In this case, the sliders 220 may be welded to the first plate 210. The guide plate 230 may be welded to the second plate 240.

Accordingly, a slide module and a mobile terminal having the same according embodiments may provide the following effects or advantages.

First, embodiments disclosed herein may prevent fluctuation and looseness from being generated between two bodies in the course of switching to an open or closed configuration by the slide mechanism.

Second, embodiments disclosed herein may provide a luxurious exterior by loading the slide module within each body so as not to be externally exposed in an open configuration.

Third, embodiments disclosed herein may include a plurality of sliders guided using a single guide plate having sufficient or a predetermined rigidity, thereby reducing a number of processes and manufacturing costs.

Embodiments disclosed herein reduce a length of a guide slot via an asymmetric slider and secure rigidity of a guide plate using an asymmetric slider.

Embodiments disclosed herein are directed to a slide module and mobile terminal including the same that substantially obviate one or more problems due to limitations and disadvantages of the related art.

Embodiments disclosed herein provide a slide module and mobile terminal including the same, for which fluctuation and looseness may be prevented from being generated between two bodies when between an open and closed configurations by a slide mechanism.

Embodiments disclosed herein further provide a slide module and mobile terminal including the same, for which a luxurious exterior may be provided by loading the slide module within each body so as not to be externally exposed in an open configuration.

Embodiments disclosed herein further provide a slide module and mobile terminal including the same, by which a plurality of sliders may be guided using a single guide plate having sufficient or a predetermined rigidity.

Embodiments disclosed herein additionally provide a slide module and mobile terminal including the same, for which a length of a guide slot may be reduced via an asymmetric slider.

Embodiments disclosed herein also provide a slide module and mobile terminal including the same, for which rigidity of a guide plate may be secured using an asymmetric slider.

Additional advantages, objects, and features of embodiments have been set forth in part in the description and in part will become apparent to those having ordinary skill in the art upon examination of the description or may be learned from practice of embodiments. The objectives and other advantages of embodiments may be realized and attained by the structure particularly pointed out in the written description and claims hereof as well as the appended drawings.

Embodiments disclosed herein provide a mobile terminal that may include a first body, a second body mounted on the first body to slidably move thereon, and a slide module having a plurality of sliders, respectively, mounted on the first body and a guide plate mounted on the second body to guide slidable movements of the plurality of the sliders.

A plurality of guide slots may be provided to the guide plate. A first end portion of each of the sliders may be guided along the corresponding guide slot. A second end portion of each of the sliders may be guided along an edge portion of the guide plate.

One end portion of the guide slot may be configured open to enable the first end portion of the slider to be inserted into the guide plate. A reinforcement bridge may be provided to the open end portion of the guide slot. The reinforcement bridge may be bent to have a prescribed height difference from the guide slot.

A projection part may be provided to the second end portion of the slider in a manner of being projected toward an inside of the guide plate, and a guide hole may be provided to the second body to guide movement of the projection part in accordance with the slidable movement of the slider. A stopper may be provided to the guide hole to maintain a slidable displacement of the projection part. The mobile terminal may further include an elastic actuator having both end portions fixed to the projection part of the slider and one side of the second body, respectively.

A length of the first end portion of each of the sliders may be formed smaller than that of the second end portion thereof. Each of the guide slots may be formed shorter than a length of the guide plate in accordance with a slidable movement of the second body. Each of the sliders may be arranged to form a symmetric structure in a slidable movement of the second body.

A keypad may be provided to the first body and a display may be provided to the second body. A display may be provided to each of the first body and the second body.

Embodiments disclosed herein further provide a slide module that may include a first plate, a plurality of sliders mounted on the first plate in a manner of being spaced apart from each other with a prescribed space in-between, a guide plate configured to guide a slidable movement of each of the sliders, and a second plate having the guide plate fixed thereto.

A plurality of guide slots may be provided to the guide plate A first end portion of each of the sliders may be guided along the corresponding guide slot. A second end portion of each of the sliders may be guided along an edge portion of the guide plate.

One end portion of the guide slot may be configured open to enable the first end portion of the slider to be inserted into the guide plate. A reinforcement bridge may be provided to the open end portion of the guide slot in a manner of being bent to have a prescribed height difference from the guide slot. The open end portion of the guide slot may be formed wider than a width of the guide slot. A length of the first end portion of each of the sliders may be formed smaller than that of the second end portion thereof.

Each of the sliders may be arranged to form a symmetric structure in a slidable movement of the second body.

Accordingly, embodiments disclosed herein may provide at least the following effects and/or advantages.

Embodiments disclosed herein may prevent the fluctuation and looseness from being generated between two bodies in the course of switching to an open or closed configuration by a slide mechanism. Further, embodiments disclosed herein may provide a luxurious exterior in a manner of loading the slide module within each body so as not to be externally exposed in an open configuration.

Embodiments disclosed herein may provide a plurality of sliders that may be guided using a single guide plate having sufficient or a predetermined rigidity, thereby reducing a number of processes and manufacturing costs. Embodiments disclosed herein may reduce a length of a guide slot via an asymmetric slider. Embodiments disclosed herein may further secure rigidity of a guide plate using an asymmetric slider.

It is to be understood that both the foregoing general description and the following detailed description of embodiments are exemplary and explanatory and are intended to provide further explanation of the invention as claimed.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal, comprising:
   a first body;
   a second body mounted on the first body so as to be slidably movable with respect to the first body; and
   a slide module disposed between the first body and second body, the slide module comprising a plurality of sliders and a guide plate that guides slidable movement of the plurality of sliders, wherein the guide plate comprises:
      a plurality of guide slots, wherein a first end portion of each of the plurality of sliders is guided along a corresponding one of the plurality of guide slots and a second end portion of each of the plurality of sliders is guided along an edge portion of the guide plate, and wherein one end portion of each of the plurality of guide slots is open to enable the first end portion of the respective plurality of sliders to be inserted into the guide plate; and
      a reinforcement bridge provided at the open end portion of each of the plurality of guide slots, wherein the reinforcement bridge is bent to have a predetermined height difference with respect to the plurality of guide slots.

2. The mobile terminal of claim 1, wherein the slide module further comprises:
   a first plate attached to the first body; and
   a second plate attached to the second body, wherein the plurality of sliders is mounted on the first plate and the guide plate is mounted on the second plate.

3. The mobile terminal of claim 2, further comprising:
   a projection part provided at the second end portion of each of the plurality of sliders, wherein the projection part projects toward a center of the guide plate; and
   a guide hole provided in the second plate that guides movement of the projection part in accordance with the slidable movement of the respective slider.

4. The mobile terminal of claim 3, wherein a stopper is provided in the guide hole that limits slidable displacement of the projection part.

5. The mobile terminal of claim 3, further comprising a plurality of elastic actuators, each having a first end portion fixed to the projection part of a respective slider of the plurality of sliders and a second end portion fixed to the second plate.

6. The mobile terminal of claim 1, wherein a length of the first end portion of each of the plurality of sliders is smaller than a length of the second end portion thereof.

7. The mobile terminal of claim 1, wherein a length of each of the plurality of guide slots is shorter than a length of the guide plate in a direction of slidable movement of the second body.

8. The mobile terminal of claim 1, wherein the plurality of sliders is symmetrically arranged with respect of a direction of slidable movement of the second body.

9. The mobile terminal of claim 1, wherein a keypad is provided on at least one of the first body or the second body, and wherein a display is provided on at least the other of the first body or the second body.

10. The mobile terminal of claim 1, wherein a display is provided on each of the first body and the second body.

11. A slide module, comprising:
    a first plate;
    a plurality of sliders mounted on the first plate, the plurality of sliders being spaced apart from each other with a predetermined spacing therebetween;
    a guide plate that guides slidable movement of each of the plurality of sliders; and
    a second plate having the guide plate fixed thereto, wherein the guide plate comprises:
       a plurality of guide slots, wherein a first end portion of each of the plurality of sliders is guided along a corresponding one of the plurality of guide slots and a second end portion of each of the plurality of sliders is guided along an edge portion of the guide plate, and wherein one end portion of each of the plurality of guide slots is open to enable the first end portion of the respective plurality of sliders to be inserted into the guide plate; and
       a reinforcement bridge provided at the open end portion of each of the plurality of guide slots, wherein the reinforcement bridge is bent to have a predetermined height difference with respect to the plurality of guide slots.

12. The slide module of claim 11, wherein a width of the open end portion of the plurality of guide slots is wider than a width of a remaining portion of the plurality of guide slots.

13. The slide module of claim 11, further comprising:
    a projection part provided at the second end portion of each of the plurality of sliders, wherein the projection part projects toward a center of the guide plate; and
    a guide hole provided in the second plate that guides movement of the projection part in accordance with the slidable movement of the respective slider.

14. The slide module of claim 13, further comprising a stopper provided in the guide hole that limits slidable displacement of the projection part.

15. The slide module of claim 13, further comprising a plurality of elastic actuators, each having a first end portion fixed to the projection part of a respective slider of the plurality of sliders and a second end portion fixed to the second plate.

16. The slide module of claim 11, wherein a length of the first end portion of each of the plurality of sliders is smaller than a length of the second end portion thereof.

17. The slide module of claim 11, wherein a length of each of the plurality of guide slots is shorter than a length of the guide plate in a direction of slidable movement of the second body.

18. The slide module of claim 17, wherein the plurality of sliders is symmetrically arranged with respect to a slidable movement of the second body.

19. A mobile terminal comprising the slide module of claim 11.

* * * * *